US009001877B2

(12) United States Patent
Rydstrom et al.

(10) Patent No.: US 9,001,877 B2
(45) Date of Patent: Apr. 7, 2015

(54) SIGNAL PROCESSING FOR DIVERSITY COMBINING RADIO RECEIVER

(75) Inventors: Mats Rydstrom, Billdal (SE); Dan Weinholt, Vastra Frolunda (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 5 days.

(21) Appl. No.: 13/977,517

(22) PCT Filed: Dec. 28, 2010

(86) PCT No.: PCT/EP2010/070781
§ 371 (c)(1),
(2), (4) Date: Jun. 28, 2013

(87) PCT Pub. No.: WO2012/089239
PCT Pub. Date: Jul. 5, 2012

(65) Prior Publication Data
US 2014/0010271 A1    Jan. 9, 2014

(51) Int. Cl.
*H04B 7/08*    (2006.01)

(52) U.S. Cl.
CPC ............ *H04B 7/0851* (2013.01); *H04B 7/0854* (2013.01)

(58) Field of Classification Search
CPC ... H04B 7/0854; H04B 7/0851; H04L 7/0029
USPC ....................................................... 375/224
See application file for complete search history.

(56) References Cited

U.S. PATENT DOCUMENTS

| 4,733,402 | A | * | 3/1988 | Monsen ......................... 375/347 |
| 5,202,903 | A | * | 4/1993 | Okanoue ....................... 375/347 |
| 5,901,174 | A | * | 5/1999 | Richard ......................... 375/229 |
| 6,839,379 | B1 | * | 1/2005 | Horng et al. ................... 375/148 |
| 7,330,068 | B2 | * | 2/2008 | Barksdale ...................... 329/315 |
| 2002/0080859 | A1 | * | 6/2002 | Mottier ......................... 375/147 |
| 2004/0105489 | A1 | * | 6/2004 | Kim et al. ...................... 375/140 |
| 2008/0030265 | A1 | * | 2/2008 | Ido et al. ........................ 329/317 |
| 2008/0037691 | A1 | * | 2/2008 | Papathanasiou et al. ..... 375/347 |
| 2009/0058728 | A1 | * | 3/2009 | Mostafa et al. ............... 342/380 |
| 2014/0010271 | A1 | * | 1/2014 | Rydstrom et al. ............ 375/224 |

FOREIGN PATENT DOCUMENTS

| EP | 1 265 378 | A2 |   | 12/2002 |   |
| EP | 1265378 | A2 | * | 12/2002 | ............... H04B 7/08 |
| EP | 1 998 471 | A1 |   | 12/2008 |   |
| EP | 2 009 813 | A1 |   | 12/2008 |   |

* cited by examiner

*Primary Examiner* — Daniel Washburn
*Assistant Examiner* — Berhanu Tadese
(74) *Attorney, Agent, or Firm* — Rothwell, Figg, Ernst & Manbeck, P.C.

(57) ABSTRACT

A signal processing device for a diversity combining radio receiver is disclosed. Said device comprises a plurality of receive branches and a joint detector adapted to determine a joint received symbol based on a combined signal. Said device also comprises a control unit adapted to determine a branch signal error based on the joint received symbol and the input signal of that receive branch. Each receive branch further comprises an adaptive filter. The control unit is adapted to update the coefficients of the adaptive filter of each receive branch based on a weighted signal error combination, wherein weight of the weighted signal error combination is selected based on channel conditions. A corresponding diversity combining radio receiver, a corresponding electronic apparatus, a corresponding method, a corresponding computer program product, and a corresponding computer readable medium are also disclosed.

19 Claims, 7 Drawing Sheets

SIGNAL PROCESSING FOR DIVERSITY COMBINING RADIO RECEIVER

CROSS REFERENCE TO RELATED APPLICATION(S)

This application is a 35 U.S.C. §371 National Phase Entry Application from PCT/EP2010/070781, filed Dec. 28, 2010, designating the United States, the disclosure of which is incorporated herein in its entirety by reference.

TECHNICAL FIELD

The present invention relates to diversity combining radio receivers.

BACKGROUND

In a so called diversity combining radio receiver, two or more received versions of the same transmitted signal are utilized in order to improve overall signal to noise ratio (SNR) and/or decrease distortion before demodulation (compared with using only a single version). In order for the diversity combining to be efficient in attaining such improvement, the noise and distortion of the two or more versions in the diversity signal branches to be combined should have low correlation, i.e. the branches should be diverse. Signal branch diversity can for instance be obtained in space by locating receiver antennas some distance apart, in frequency by using different carriers, or in antenna polarity. A distinction if often made between soft combining diversity and hard switching diversity. In the latter case, one of the received signals (the one deemed most "trustworthy") is used for detection and the remaining signals are discarded. In soft diversity combining systems two or more received waveforms, henceforth denoted branches, are aligned in delay and phase, weighted according to their relative signal quality and coherently summed together before detection. Thus, there is a need for relatively accurate means for evaluating the signal quality of a diversity-combining radio receiver.

SUMMARY

Accordingly, an object of the present invention is to provide means for evaluating signal quality in a diversity-combining radio receiver.

According to a first aspect, there is provided a signal processing device for a diversity combining radio receiver. The signal processing device comprises a plurality of receive branches. Each receive branch is adapted to process an input signal originating from a corresponding radio reception path. Furthermore, the signal processing device comprises a joint detector adapted to determine a joint received symbol based on a combined signal. The combined signal is a combination of weighted output signals from the plurality of receive branches. For each receive branch, the output signal of that receive branch is weighted with a branch weight associated with that receive branch. Moreover, the signal processing device comprises a control unit adapted to, for each receive branch, determine a branch signal error associated with that receive branch based on the joint received symbol and the input signal of that receive branch. The control unit may be further adapted to select the branch weights associated with the plurality of receive branches based on the branch signal errors associated with the plurality of receive branches.

The control unit may be adapted to, for each receive branch, determine a mean square signal error associated with that receive branch based on a plurality of samples of the branch signal error of that receive branch. Furthermore, the control unit may be adapted to select the branch weights associated with the plurality of receive branches based on the determined mean square signal errors associated with the plurality of receive branches.

At least one of the receive branches may have an invertible transfer function. The control unit may be adapted to, for each of the at least one receive branch, process the joint received symbol with the inverse of said transfer function of that receive branch to determine a nominal input signal of that receive branch. Furthermore, the control unit may be adapted to, for each of the at least one receive branch, determine the branch signal error of that receive branch based on the nominal input signal of that receive branch and the actual input signal of that receive branch.

According to some embodiments, each receive branch comprises an adaptive filter. The control unit may be adapted to, for each receive branch, update coefficients of the adaptive filter of that receive branch based on the branch signal error of that receive branch. For example, the control unit may be adapted to determine a joint signal error of the combined signal. Furthermore, the control unit may be adapted to, for each receive branch, update coefficients of the adaptive filter of that receive branch based on a weighted signal error combination of the branch signal error of that receive branch and the joint signal error.

The control unit may be adapted to, for each receive branch, determine the weights of the branch signal error of that receive branch and the joint signal error in said weighted signal error combination based on current channel conditions of the radio reception paths associated with the receive branches.

The control unit may be adapted to, for each receive branch, determine the weights of the branch signal error of that receive branch and the joint signal error in said weighted signal error combination based on current received signal power over said radio reception paths associated with the receive branches in a plurality of frequency sub bands.

According to a second aspect, there is provided a diversity combining radio receiver comprising a signal processing device according to the first aspect.

According to a third aspect, there is provided an electronic apparatus comprising the diversity combining radio receiver according the second aspect. The electronic apparatus may e.g. be, but is not limited to, a radio base station, a mobile terminal, or a transceiver device for a fixed point-to-point radio link.

According to a fourth aspect, there is provided a method of signal processing for a diversity combining radio receiver. The method comprises, for each of a plurality of radio reception paths, processing an input signal originating from that radio reception paths in a corresponding receive branch of a plurality of receive branches. Furthermore, the method comprises determining a joint received symbol based on a combined signal, which is a combination of weighted output signals from the plurality of receive branches. For each receive branch, the output signal of that receive branch is weighted with a branch weight associated with that receive branch. Furthermore, the method comprises, for each receive branch, determining a branch signal error associated with that receive branch based on the joint received symbol and an input signal of that receive branch.

The method may further comprise selecting the branch weights associated with the plurality of receive branches based on the branch signal errors associated with the plurality of receive branches.

Furthermore, the method may comprise, for each receive branch, determining a mean square signal error associated with that receive branch based on a plurality of samples of the branch signal error of that receive branch. Selecting the branch weights associated with the plurality of receive branches based on the branch signal errors associated with the plurality of receive branches may comprise selecting said branch weights associated with the plurality of receive branches based on the determined mean square signal errors associated with the plurality of receive branches.

At least one of the receive branches may have an invertible transfer function. The method may comprise, for each of the at least one receive branch, processing the joint received symbol with the inverse of said transfer function of that receive branch to determine a nominal input signal to that receive branch. Furthermore, the method may comprise, for each of the at least one receive branch, determining the branch signal error of that receive branch based on the nominal input signal of that receive branch and the actual input signal of that receive branch.

For each receive branch, processing the input signal may comprise filtering the input signal with an adaptive filter. The method may comprise, for each receive branch, updating coefficients of the adaptive filter of that receive branch based on the branch signal error of that receive branch.

The method may comprise determining a joint signal error of the combined signal. Furthermore, the method may comprise, for each receive branch, updating coefficients of the adaptive filter of that receive branch based on a weighted signal error combination of the branch signal error of that receive branch and the joint signal error.

The method may comprise, for each receive branch, determining the weights of the branch signal error of that receive branch and the joint signal error in said weighted signal error combination based on current channel conditions of the radio reception paths associated with the receive branches.

The method may comprise, for each receive branch, determining the weights of the branch signal error of that receive branch and the joint signal error in said weighted signal error combination based on current received signal power over said radio reception paths associated with the receive branches in a plurality of frequency sub bands.

According to a fifth aspect, there is provided a computer program product comprising computer program code means for executing the method according to the fourth aspect when said computer program code means are run by a programmable signal processing device of the diversity combining radio receiver.

According to a sixth aspect, there is provided a computer readable medium having stored thereon a computer program product comprising computer program code means for executing the method according to the fourth aspect when said computer program code means are run by a programmable signal processing device of the diversity combining radio receiver.

Further embodiments of the invention are defined in the dependent claims.

It should be emphasized that the term "comprises/comprising" when used in this specification is taken to specify the presence of stated features, integers, steps, or components, but does not preclude the presence or addition of one or more other features, integers, steps, components, or groups thereof.

BRIEF DESCRIPTION OF THE DRAWINGS

Further objects, features and advantages of embodiments of the invention will appear from the following detailed description, reference being made to the accompanying drawings, in which.

DETAILED DESCRIPTION

Figure 1:
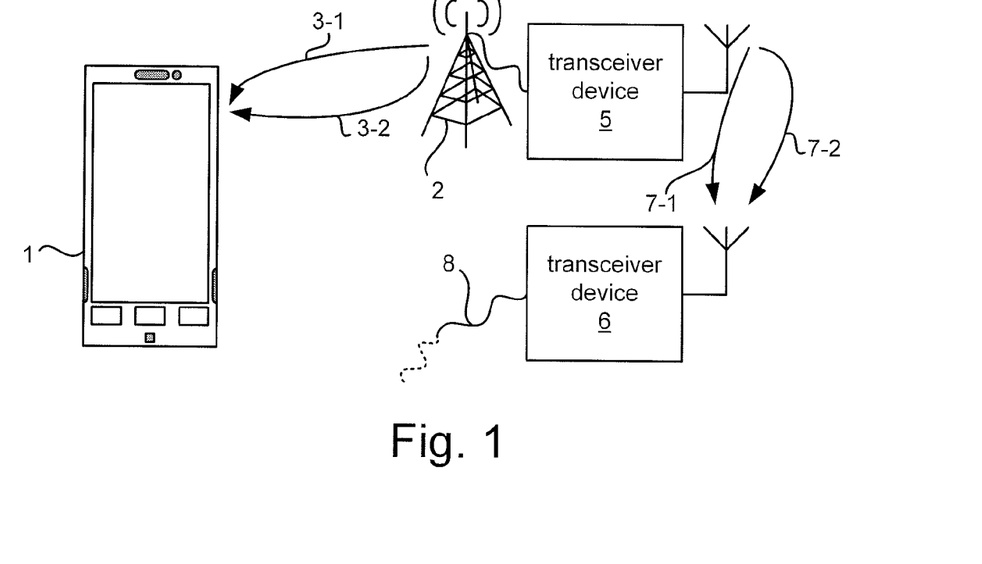
FIG. 1 schematically illustrates a communication environment.

FIG. 1 schematically illustrates a communication environment, in which embodiments of the present invention may be employed. A mobile terminal 1, such as a mobile phone or the like, is arranged in radio communication with a radio base station (BS) 2, for example in a cellular communication network. The mobile terminal 1 may receive signals from the BS 2 over a plurality of radio reception paths, two of which are illustrated in FIG. 1 and denoted 3-1 and 3-2. Below, these radio reception paths are generically denoted 3-i. The signals received over the different radio reception paths 3-i may originate from the same transmitted signal. The different radio reception paths may have mutually different characteristics, e.g. in terms of noise, interference, linear distortion, and/or nonlinear distortion such that said signals received over the different radio reception paths 3-i are mutually different even though they originate from the same transmitted signal. Applying diversity combining in the mobile terminal 1 on such a plurality of received signals originating from the same transmitted signal may result in a combined signal with higher signal quality than any of the individual received signals. A similar plurality of radio reception paths (not shown) may naturally also exist in the opposite direction (i.e. with the mobile terminal 1 on the transmitter side and the BS 2 on the receiver side). Diversity combining may thus equally well be applied in the BS 2. As is also illustrated in FIG. 1, the communication environment may comprise a fixed point-to-point radio link having transceiver devices 5 and 6. Such a fixed point-to-point radio link may e.g. be used for so called backhauling to relay signals from the BS 2 to a geographical location with access e.g. to a network connection over an optical fiber 8, which may form part of a backbone network. As illustrated in FIG. 1, transceiver device 6 may receive signals from the transceiver device 5 over a plurality of radio reception paths, two of which are illustrated in FIG. 1 and denoted 7-1 and 7-2. Below, these radio reception paths are generically denoted 7-*i*. Similarly to the signals received over the radio reception paths 3-*i* discussed above, the signals received over the different radio reception paths 7-*i* may originate from the same transmitted signal. Similarly to the radio reception paths 3-*i*, the different radio reception paths 7-*i* may have mutually different characteristics, e.g. in terms of noise, interference, linear distortion, and/or nonlinear distortion such that said signals received over the different radio reception paths 7-*i* are mutually different even though they originate from the same transmitted signal. Diversity combining may be applied in the transceiver device 6 on such a plurality of received signals originating from the same transmitted signal in order to obtain a combined signal with higher signal quality than any of the individual received signals. A similar plurality of radio reception paths (not shown) may naturally also exist in the opposite direction (i.e. with the transceiver device 6 on the transmitter side and the transceiver device 5 on the receiver side). Diversity combining may thus equally well be applied in the transceiver device 6. The mobile terminal 1, the BS 2, and the transceiver devices 5 and 6 are nonlimiting examples of what is generically referred to below as "an electronic apparatus".

Figure 2:
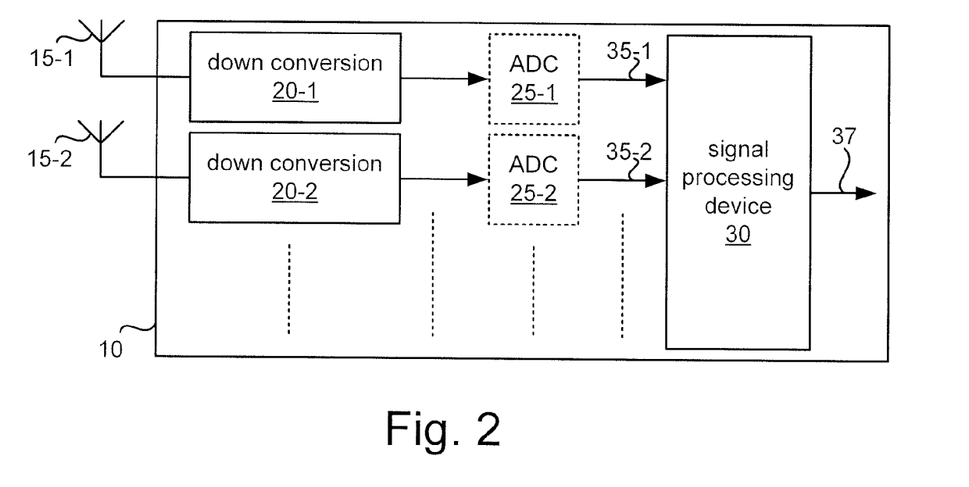
FIG. 2 is a block diagram of a diversity combining radio receiver according to an embodiment of the present invention.

FIG. 2 is a block diagram of a diversity combining radio receiver 10 (in the following referred to as "the radio receiver 10" for simplicity) according to an embodiment of the present invention. The radio receiver 10 may be comprised in an electronic apparatus, such as but not limited to the mobile terminal 1, the BS 2, or any of the transceiver devices 5 and 6. According to the embodiment, the radio receiver 10 comprises a plurality of parallel signal paths, each adapted for receiving signals (which originate from the same transmitted signal) over a corresponding radio reception path, such as the radio reception paths 3-*i* or 7-*i* (FIG. 1). A first signal path is shown in FIG. 2 as connected to a first antenna 15-1. The first signal path comprises a down conversion unit 20-1 for frequency down conversion of a radio-frequency (RF) signal received at the antenna 15-1. As illustrated in FIG. 2, the first signal path may also comprise an ADC 25-1 for converting the output signal from the down conversion unit 20-1 to a digital representation for facilitating digital signal processing. Also illustrated in FIG. 2 is a second signal path, in FIG. 2 shown as connected to a second antenna 15-2. Similarly to the first signal path, the second signal path may comprise a down conversion unit 20-2 and an ADC 25-2. Although two signal paths are shown in FIG. 2, more such signal paths, which may be similar or identical in constitution to the first and second signal paths, may be present in some embodiments, which is illustrated with vertical dotted lines under the first and second signal paths in FIG. 2. The down conversion units 20-*i* may e.g. comprise one or more filters, mixers, low-noise amplifiers, etc, for performing the frequency down conversion. The implementation of such circuits are well known to a person skilled in the art and is therefore not further discussed herein in any detail.

In addition, the embodiment of the radio receiver 10 shown in FIG. 2 comprises a signal processing device 30 for diversity combining of the output signals from said signal paths. In accordance with the description above, the output signals from each of said signal paths originates from a corresponding radio reception path, such as the radio reception paths 3-*i* or 7-*i* (FIG. 1). According to the embodiment illustrated in FIG. 2, the signal processing device 30 has a plurality of input ports 35-*i*, each arranged for connection to a corresponding one of said signal paths. Furthermore, according to the embodiment illustrated in FIG. 2, the signal processing device 30 has an output port 37 for outputting an output signal of the signal processing device 30.

The dotted boxes used for illustrating the ADCs 25-*i* are used to indicate that this placement of the ADCs is optional. For example, the ADCs 25-*i* may be incorporated into the signal processing device 30, or into the down-conversion units 20-*i*.

Figure 3:
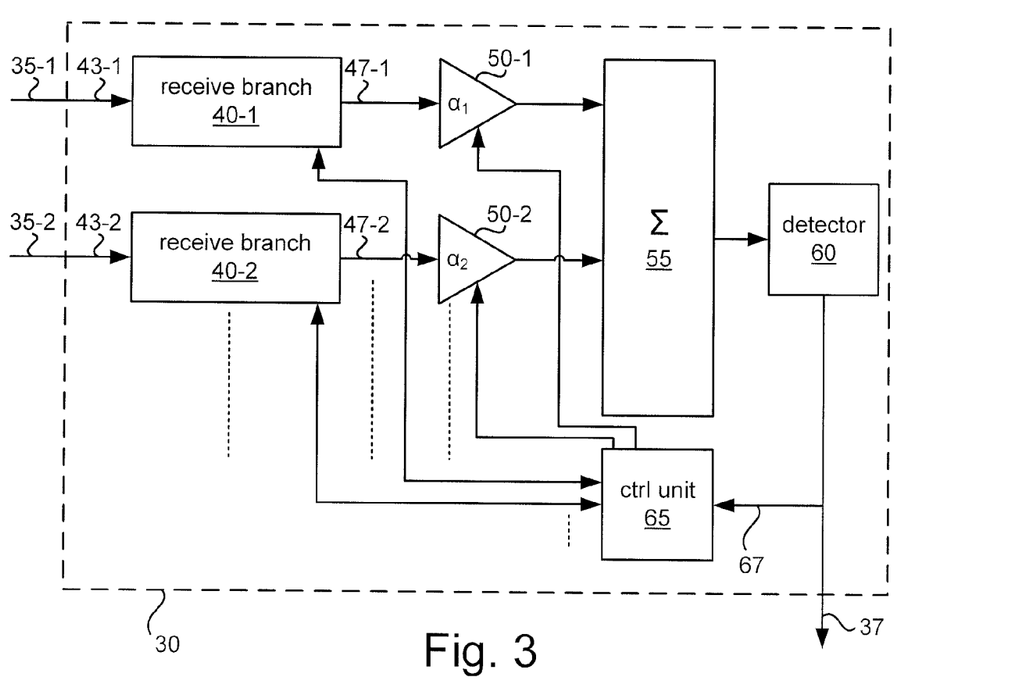
FIG. 3 is a block diagram of a signal processing device according to an embodiment of the present invention.

FIG. 3 is a block diagram of the signal processing device 30 according to an embodiment of the present invention. According to the embodiment, the signal processing device 30 comprises a plurality of receive branches 40-*i*, each having an input port 43-*i* and an output port 47-*i*. Each receive branch 40-*i* is adapted to process an input signal originating from a corresponding radio reception path, such as the radio reception paths 3-*i* or 7-*i* (FIG. 1). According to the embodiment illustrated in FIG. 3, the input port 43-*i* of the receive branch 40-*i* is connected to a corresponding input port 35-*i* of the signal processing device. Thus, referring back to FIG. 2, said input signal originating from a corresponding radio reception path is an output signal from the signal path of the radio receiver 10 that is connected to the corresponding input port 35-*i* of the signal processing device 30. Furthermore, according to the embodiment illustrated in FIG. 3, the signal processing device 30 comprises a plurality of multiplication units 50-*i*. Each multiplication unit 50-*i* is operatively connected to the output port 47-*i* of a corresponding receive branch 40-*i*. Furthermore, each multiplication unit 50-*i* is adapted to multiply the output signal of the corresponding receive branch 40-*i* with a weight, or factor, $\alpha_i$ thereby forming a weighted output signal of the receive branch 40-*i*. Hence, for each receive branch 40-*i*, the output signal of that receive branch 40-*i* is weighted with a branch weight $\alpha_i$ associated with that receive branch 40-*i*. In the embodiment illustrated in FIG. 3, the multiplication units 50-*i* are all connected to an adder unit 55, which is adapted to form a combined signal, which is a combination of weighted output signals from the receive branches 40-*i*. The combined signal s[n] may thus be expressed as $$s[n] = \sum_i \alpha_i[n] s_i[n] \qquad \text{Eq. 1}$$

where $\alpha_i[n]s_i[n]$ is the output signal from the multiplication unit 40-*i*, $s_i[n]$ is the output signal from the receive branch 40-*i*, and n is a discrete-time sequence index. The weights $\alpha_i$ are written as a function of n to indicate that the weights are updated based on the signal quality of the different receive branches 40-*i*, and may thus vary in time. Qualitatively spoken, with proper selection of the weights $\alpha_i$, the combined signal s[n] has a higher signal quality than each of the individual signals $s_i[n]$ taken alone, which is a basic concept behind diversity combining.

According to the embodiment illustrated in FIG. 3, the signal processing device further comprises a joint detector, or joint slicer, 60 operatively connected to an output port of the adder unit 55. The joint detector 60 is adapted to determine a joint received symbol based on the combined signal. Such detectors are known as such, and therefore not further discussed herein in any further detail. The type of detector to be used naturally depends on the modulation format, and should be selected accordingly. As illustrated in FIG. 3, an output port of the detector may be operatively connected to the output port 37 of the signal processing device 30. Thus, the output signal of the detector 60 may be the output signal of the signal processing device 30.

In addition, according to the embodiment illustrated in FIG. 3, the signal processing device comprises a control unit 65. The control unit 65 is adapted to, for each receive branch 40-$i$, determine a branch signal error associated with that receive branch based on the joint received symbol and the input signal of that receive branch 40-$i$. The branch signal errors thus determined may be used for updating parameters of the signal processing device 30, such as the branch weights $\alpha_i$ and/or coefficients of adaptive filters, such as equalizer filters or the like, etc., as is further described below.

Advantages of utilization of the branch signal errors determined based on the joint received symbol and the input signals of the individual receive branches are discussed below with reference to two reference examples (i.e. two alternative approaches included for comparison with embodiments of the present invention).

As a first reference example, a case is considered where each receive branch instead has its own dedicated detector for determining a specific received symbol of that receive branch, which is used instead of the above-mentioned joint received symbol in the determination of the branch signal error. Compared with this first reference example, embodiments of the present invention, wherein the branch signal error associated with each receive branch 40-$i$ is determined based on the joint received symbol and the input signal of that receive branch 40-$i$, has at least two advantages. First of all, there is no need for dedicated detectors for each receive branch 40-$i$, which thus facilitates a reduction of hardware cost. Furthermore, since the combined signal s[n] has a higher quality than each of the individual signals $s_i$[n], the joint received symbol is less prone to errors than the specific received symbols determined for each branch individually. Therefore, the branch signal errors determined as in embodiments of the present invention has a higher reliability than those determined as in the first reference example, which as a consequence facilitates a better updating of parameters based on the branch signal errors.

As a second reference example, a case is considered where no branch signal errors are determined for the individual receive branches, but instead only a joint signal error of the combined signal is determined based on the combined signal and the joint received symbol. This has the advantage over the first reference example that no dedicated detectors are required for the individual receive branches. However, since no branch signal errors are determined, no quality metric for the individual receive branches are available as a basis for updating parameters such as the branch weights $\alpha_i$. In this respect, embodiments of the present invention are advantageous over this second reference example, since they, also compared with this second reference example, provides for a better updating of parameters.

Figure 4:
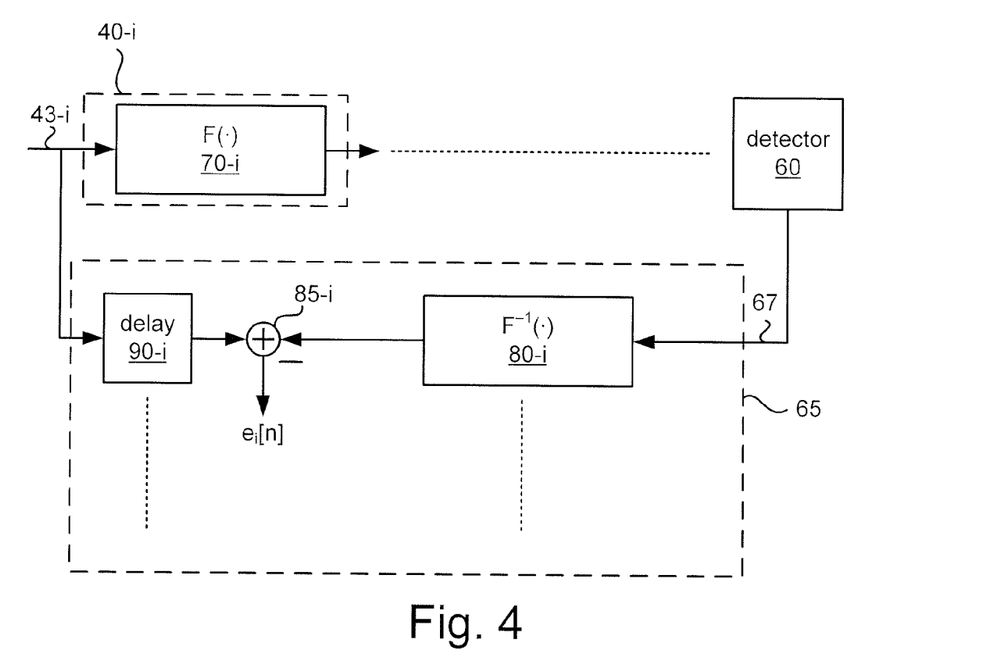
FIG. 4 is a block diagram of part of a signal processing device according to an embodiment of the present invention.

According to some embodiments of the present invention, at least one (possibly two or more, or even all) of the receive branches 40-$i$ has an invertible transfer function. This is illustrated in FIG. 4, wherein the receive branch 40-$i$ comprises a filter unit 70-$i$ with an invertible transfer function F(•). The filter unit 70-$i$ may be an adaptive filter, such as but not limited to an adaptive equalization filter of the receive branch 40-$i$. Furthermore, the control unit 65 may be adapted to, for each of the at least one receive branch 40-$i$, process the joint received symbol with the inverse of said transfer function of that receive branch 40-$i$ to determine a nominal input signal of that receive branch 40-$i$ and determine the branch signal error of that receive branch 40-$i$ based on the nominal input signal of that receive branch 40-$i$ and the actual input signal of that receive branch 40-$i$. This is also illustrated in FIG. 4, wherein part of the control unit is shown. The output signal from the detector 60 (i.e. the joint received symbol) is fed through a filter unit 80-$i$ of the control unit 65. The filter unit 80-$i$ has a transfer function $F^{-1}(•)$, which is the inverse of the transfer function F(•) of the filter unit 70-$i$ of the receive branch 40-$i$. The output signal of the filter unit 80-$i$ is thus a nominal, or ideal or error-free, input signal of the receive branch 40-$i$. That is, a hypothetical input signal to the receive branch 40-$i$ that would have produced the joint received symbol, without any error, at the output of the receive branch 40-$i$. Said nominal input signal is subtracted from the actual input signal of the receive branch 40-$i$ in a subtraction unit 85-$i$ comprised in the control unit 65, thereby generating the branch signal error $e_i$[n] of the receive branch 40-$i$. As illustrated in FIG. 4, a delay unit 90-$i$ may be needed between the input port 43-$i$ of the receive branch 40-$i$ and the positive input port of the subtraction element 85-$i$ to account for an inherent delay in the signal path between the input port 43-$i$ of the receive branch 40-$i$ and the negative input port of the subtraction unit 85-$i$.

In FIG. 4, only a single invertible transfer function F(•) is considered. However, in other embodiments, any number of invertible operations may be applied in cascade in the receive branch 40-$i$. The control unit 65 may then be adapted to apply the inverses of these invertible operations, in reverse order, to the joint received symbol in order to determine the nominal input signal of the receive branch 40-$i$.

Figure 5:
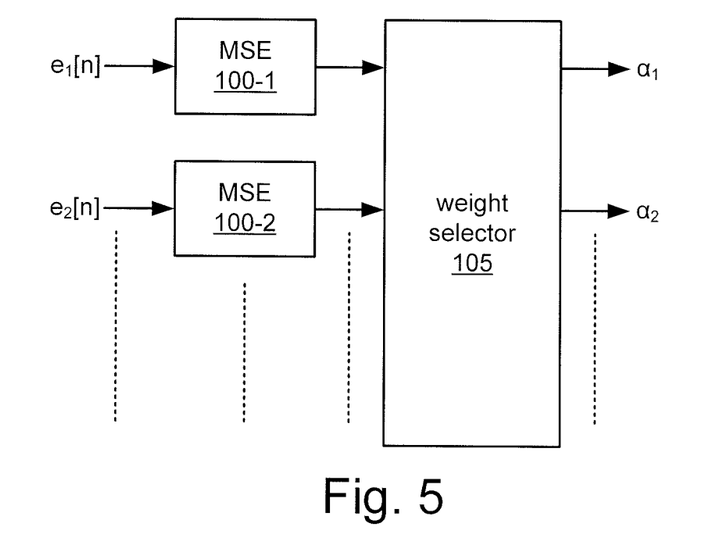
FIG. 5 is a block diagram of part of a control unit according to an embodiment of the present invention.

As hinted above, the control unit 65 may in some embodiment be further adapted to select the branch weights $\alpha_i$ associated with the plurality of receive branches 40-$i$ based on the branch signal errors associated with the plurality of receive branches 40-$i$. For example, the control unit 65 may be adapted to, for each receive branch 40-$i$, determine a mean square signal error (in the following denoted $MSE_i$) associated with that receive branch 40-$i$ based on a plurality of samples of the branch signal error of that receive branch 40-$i$. Furthermore, the control unit 65 may be adapted to select the branch weights $\alpha_i$ associated with the plurality of receive branches 40-$i$ based on the determined mean square signal errors $MSE_i$ associated with the plurality of receive branches 40-$i$. This is illustrated in FIG. 5, which shows a block diagram of part of the control unit 65 according to an embodiment of the present invention. According to this embodiment, for each receive branch 40-$i$, the control unit 65 comprises a corresponding MSE unit 100-$i$ arranged to receive the sample values of the branch signal error $e_i$[n] and compute $MSE_i$, which is in turn input to a weight selector 105 of the control unit 65. The weight selector 105 is adapted to determine the values of the weights $\alpha_i$ based on the mean square signal errors $MSE_i$. For example, the branch weights $\alpha_i$ may be selected according to:

$$\alpha_i = \frac{MSE_i^{-1}}{\sum_k MSE_k^{-1}} \qquad \text{Eq. 2}$$

The selection of weights according to Eq. 2 corresponds to the so called BLUE (Best Linear Unbiased Estimator) estimator, which has been shown to be optimal in additive white Gaussian noise (AWGN) scenarios.

As indicated above, each receive branch 40-$i$ may comprise an adaptive filter, such as the filter 70-$i$, which may e.g. be an equalization filter. Signal errors are commonly used in adaptive filters for updating filter coefficients according to some updating algorithm, such as but not limited to least mean squares (LMS) algorithms. In general, the updated coefficient values may be generated as a function of the previous coefficient values and the signal error, i.e.

$$c[n]=f(c[n-1],e_{update}[n])$$ Eq. 3 where c[n] and c[n−1] denote the updated and previous coefficient vectors, respectively, and $e_{update}[n]$ denotes the signal error that is used for updating the coefficients.

In the following, $e_{update,i}[n]$ denotes the error that is utilized in the receive branch 40-$i$ for updating the adaptive filter 70-$i$ in that receive branch 40-$i$ in accordance with embodiments of the present invention. According to some embodiments of the present invention, $e_{update,i}[n]$ may be, or be based at least partly on, the branch signal error $e_i[n]$ of the branch 40-$i$. Hence, according to some embodiments, the control unit 65 is adapted to, for each receive branch 40-$i$, update coefficients of the adaptive filter 70-$i$ of that receive branch 40-$i$ based on the branch signal error $e_i[n]$ of that receive branch 40-$i$.

Figure 6:
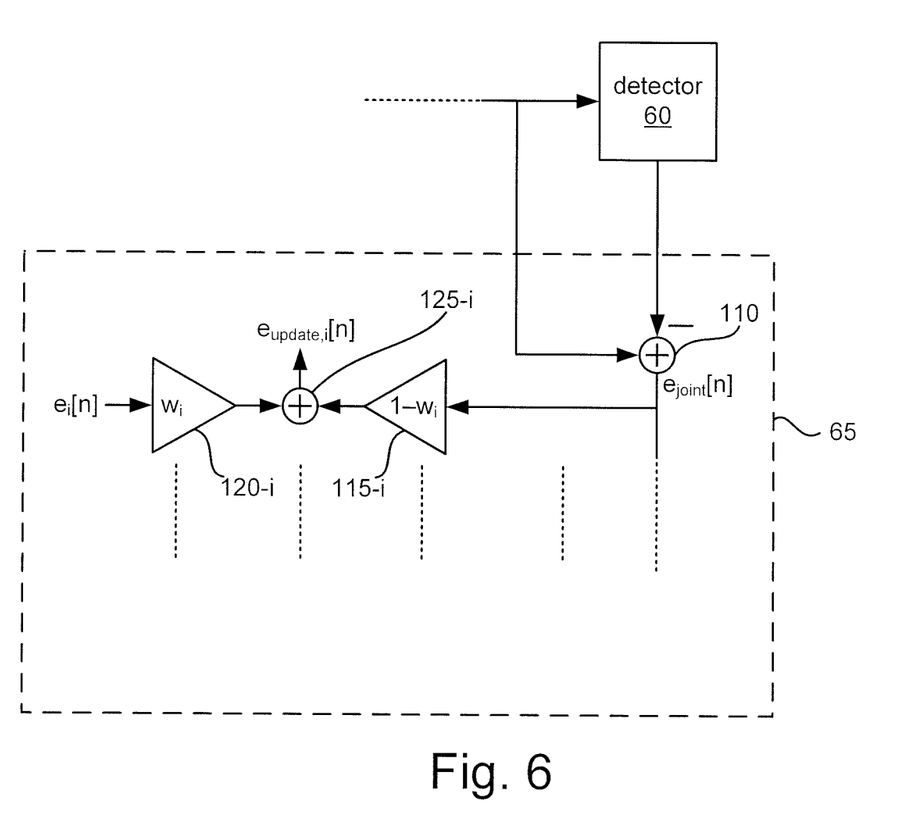
FIG. 6 is a block diagram of part of a signal processing device according to an embodiment of the present invention.

The control unit 65 may, in some embodiments, be further adapted to determine a joint signal error, in the following denoted $e_{joint}[n]$, of the combined signal based on the combined signal and the determined joint received symbol, e.g. as a difference between the actual combined signal and a nominal combined signal, which exactly represents the determined joint received symbol without error. The nominal combined signal may e.g. be equal to the determined joint received symbol. The inventors have realized that it can be beneficial, under certain channel conditions, to base $e_{update,i}[n]$ at least partly on $e_{joint}[n]$. According to some embodiments, $e_{update,i}[n]$ may be determined as a weighted combination of $e_i[n]$ and $e_{joint}[n]$, for example $$e_{update,i}[n]=w_i e_i[n]+(1-w_i)e_{joint}[n]$$ Eq. 4 where $0 \le w_i \le 1$. Accordingly, in some embodiments, the control unit 65 is adapted to, for each receive branch 40-$i$, update coefficients of the adaptive filter 70-$i$ of that receive branch 40-$i$ based on a weighted signal error combination of the branch signal error $e_i$ of that receive branch 40-$i$ and the joint signal error $e_{joint}$. This is illustrated in FIG. 6, showing part of the control unit 65 together with the detector 60. As shown in FIG. 6, the control unit 65 may comprise a subtraction unit 110 arranged to receive the combined signal at a positive input port and the determined joint received symbol (or the above-mentioned nominal combined signal, which exactly represents the determined joint received symbol without error) on a negative input port, and to generate the joint signal error $e_{joint}[n]$ on an output port of the subtraction unit 110. For each receive branch 40-$i$, the control unit 65 may further comprise a multiplication unit 115-$i$ arranged to receive the joint signal error $e_{joint}[n]$, multiply it with the weight $(1-w_i)$, and output the resulting product at an output port of the multiplication unit 115-$i$. Furthermore, for each receive branch 40-$i$, the control unit 65 may further comprise a multiplication unit 120-$i$ arranged to receive the branch signal error $e_i[n]$, multiply it with the weight $w_i$, and output the resulting product at an output port of the multiplication unit 120-$i$. In the embodiment illustrated in FIG. 6, the output ports of the multiplication units 115-$i$ and 120-$i$ are operatively connected to an adder unit 125-$i$, which is arranged to generate the error $e_{update,i}[n]$ to be used for updating coefficients of the adaptive filter 70-$i$, e.g. in accordance with Eq. 4 above.

The inventors have realized that, qualitatively speaking, if there are great differences in the channel responses of the different radio reception paths, for example in the case of two receive branches, if the first receive branch 40-1 experiences a deep notch fade at one frequency, and the second receive branch 40-2 experiences a deep fade notch at another frequency, the coefficient update should be mainly based on the joint signal error $e_{joint}$ (i.e. $w_1$ and $w_2$ should be relatively low). Under other channel conditions, it may instead be beneficial to base the coefficient updating mainly on the branch signal errors of the respective branches (i.e. $w_1$ and $w_2$ should be relatively high, or close to 1). Under yet other channel conditions, another mix of $e_i$ and $e_{joint}$ may be suitable. Thus, the control unit 65 may be adapted to, for each receive branch 40-$i$, determine the weights $w_i$ of the branch signal error of that receive branch 40-$i$ (and consequently the weights $(1-w_i)$ of the joint signal error) in said weighted signal error combination based on current channel conditions of the radio reception paths (e.g. 3-$i$ or 7-$i$) associated with the receive branches 40-$i$.

Figure 7:
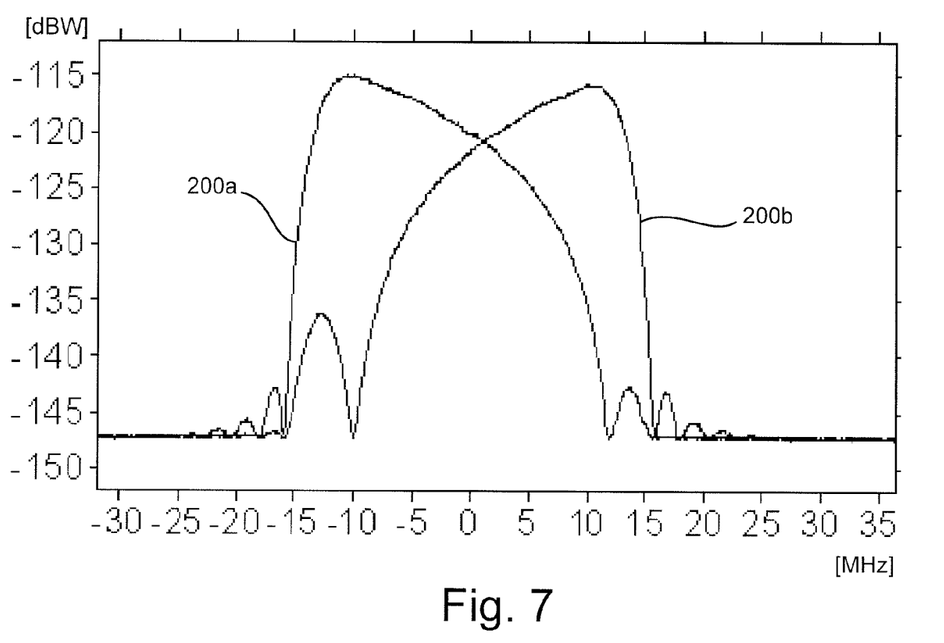
FIGS. 7-8 show plotted simulation results according to elucidating examples.
Figure 8:
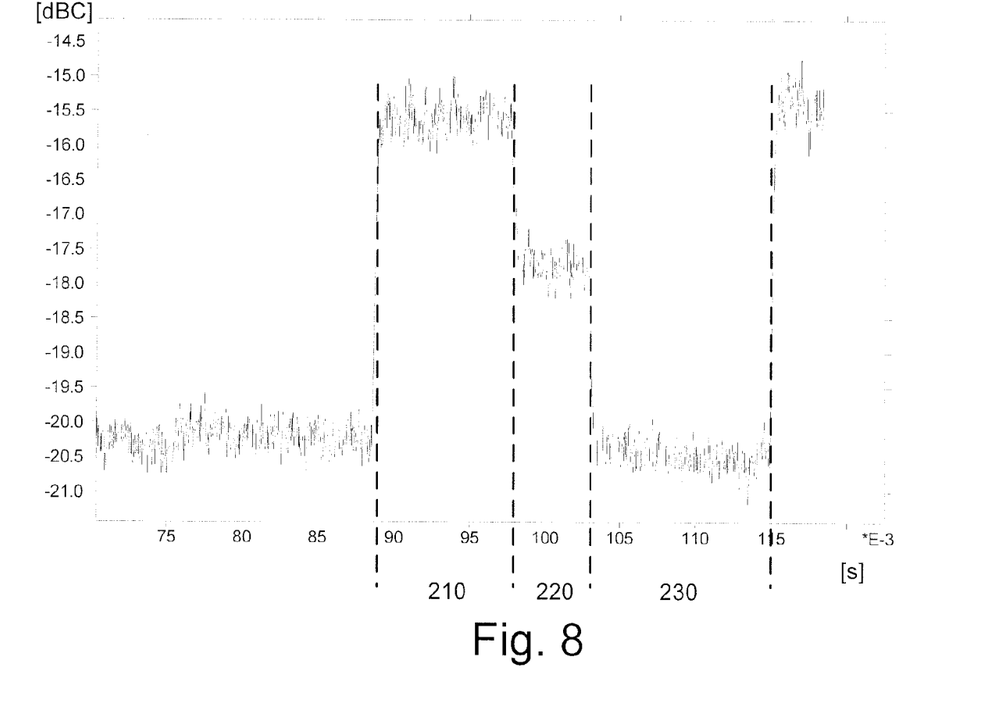

FIGS. 7 and 8 show simulation results that illustrate the selection of $w_i$ according to an example. In this example, two receive branches 40-1 and 40-2 are considered. FIG. 7 shows the received signal power 200-1 versus frequency over a first radio reception path corresponding to the first receive branch 40-1, and the received signal power 200-2 versus frequency over a second radio reception path corresponding to the second receive branch 40-2. The plots shown in FIG. 7 illustrate the received signal power after frequency down conversion to base band. As can be seen from the plots in FIG. 7, a relatively deep fade notch is experienced in the first receive branch 40-1 at around 11 MHz. Similarly, a relatively deep fade notch is experienced in the second receive branch 40-2 at around −10 MHz. Hence, according to the discussion above, the updating of the adaptive filter coefficients should in this case mainly be based on the joint signal error $e_{joint}[n]$. FIG. 8 shows the joint MSE (i.e. the MSE of the combined signal) plotted versus time. Different values of $w_i$ are used in different time intervals. In a first time interval 210, $w_1=w_2=1$. In a second time interval 220, $w_1=w_2=0.5$. In a third time interval 230, $w_1=w_2=0$. It can bee seen from the plot in FIG. 8 that, in conformance with the discussion above, of the three tested selections of $w_i$, $w_1=w_2=0$ (i.e. when the coefficient updating is based solely on $e_{joint}[n]$) gives the best (smallest) joint MSE for these particular channel conditions.

According to some embodiments of the present invention, the weights $w_i$ may be determined based on current received signal power in a plurality of frequency sub bands that together span an entire channel bandwidth of the radio receiver 10. For example, in the case of two receive branches and N sub bands, the weights $w_i$ may be determined as follows. Let $P_j^i$ denote the received signal power in sub band number j of the i:th receive branch. For each i, the values of $P_j^i$ may be normalized, e.g. such that the maximum $P_j^i$ is equal to some predetermined maximum power value, or such that the total power $\Sigma_j P_j^i$ over all frequency sub bands is equal to some predetermined total power value. Such normalization may e.g. be accomplished in the digital domain. Alternatively, normalization may be accomplished in the analog domain, e.g. using an amplifier with so called automatic gain control. According to an embodiment, $w_1=w_2=w$ is given by $$w = 1 - \sum_{j=1}^{N} h_j |P_j^1 - P_j^2|$$ Eq. 5 where $h_j$ is a predefined tuning parameter for sub band number j, and the different $h_j$:s are selected such that $$0 \le \sum_{j=1}^{N} h_j |P_j^1 - P_j^2| \le 1 \qquad \text{Eq. 6}$$

for all possible values of $P_j^1$ and $P_j^2$, j=1, 2, . . . , N. Suitable or optimal values of $h_j$ may e.g. be determined based on computer simulations and/or measurements.

Eq. 5 only concerns the case with two receive branches. An alternative solution, that works for two receive branches, but also for more than two receive branches is to use a look-up table (LUT) based approach. The values of $P_j^i$ may first be determined for all combinations of i (receive branches) and j (sub bands). The determined values of $P_j^i$ may then be used to address an LUT having stored therein suitable or optimal values of $w_i$ for a given combination of different $P_j^i$. Said suitable or optimal values of $w_i$ for given combinations of different $P_j^i$ may e.g. be predetermined based on computer simulations and/or measurements.

Figure 9:
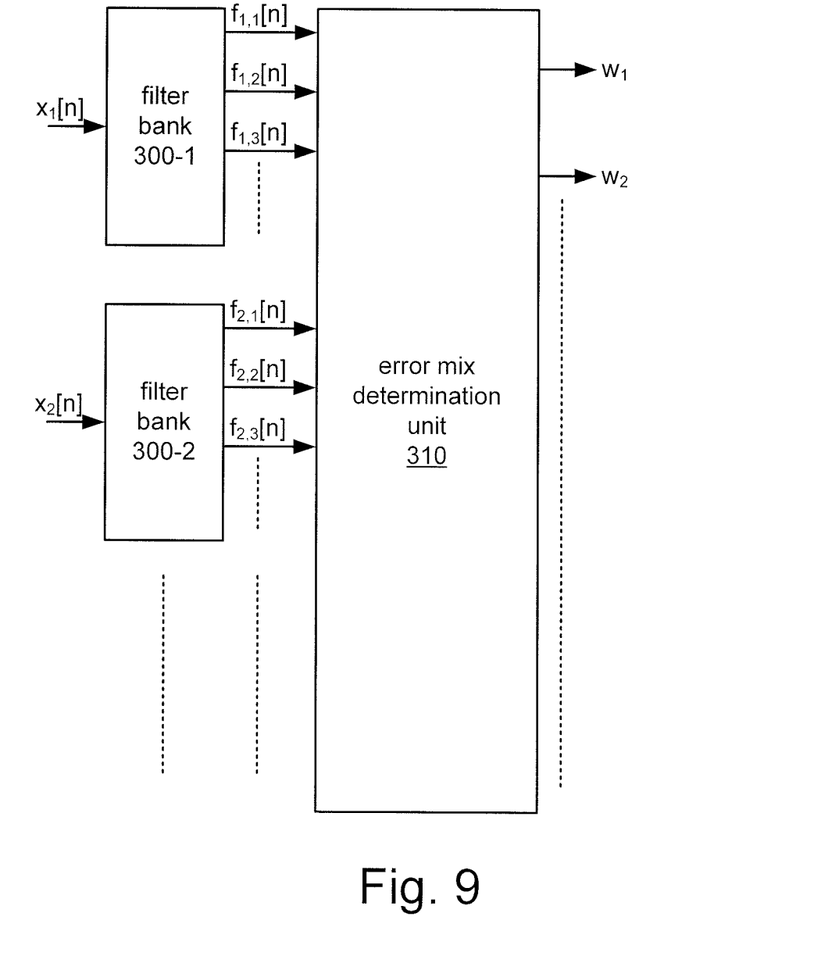
FIG. 9 is a block diagram of part of a control unit according to an embodiment of the present invention.

In accordance with the above, the control unit 65 may be adapted to, for each receive branch 40-i, determine the weights $w_i$ of the branch signal error of that receive branch 40-i (and consequently the weights $(1-w_i)$ of the joint signal error) in said weighted signal error combination based on current received signal power over said radio reception paths (e.g. 3-i or 7-i) associated with the receive branches 40-i in a plurality of frequency sub bands. This is illustrated in FIG. 9, showing a block diagram of part of the control unit 65 according to an embodiment of the present invention. According to this embodiment, the control unit 65 comprises, for each receive branch 40-i, a filter bank 300-i arranged to split an input signal (denoted $x_i[n]$ in FIG. 9) of the receive branch 40-i into a number components $f_{i,j}[n]$, where $f_{i,j}[n]$ is the component of $x_i[n]$ in sub band number j. The components $f_{i,j}[n]$ are then input to an error mix determination unit 310 comprised in the control unit 65. The error mix determination unit 310 is adapted to generate the values of $w_i$, e.g. based on Eq. 5 or the above-mentioned LUT based approach.

According to some embodiments of the present invention, there is provided a method of signal processing for a diversity combining radio receiver, such as the radio receiver 10. The method may e.g. be performed by the signal processing device 30 (FIGS. 2 and 3). According to some embodiments, and in conformance with embodiments of the signal processing device 30 described above, the method comprises, for each of a plurality of radio reception paths (such as the radio reception paths 3-i or 7-i), processing an input signal originating from that radio reception path in a corresponding receive branch of a plurality of receive branches (such as the receive branches 40-i of the signal processing device 30). Furthermore, according to some embodiments, the method comprises determining (e.g. using the detector 60) a joint received symbol based on a combined signal, which is a combination of weighted output signals (e.g. generated by the multiplication units 50-i and the adder unit 55) from the plurality of receive branches. As mentioned above in the context of the signal processing device 30, for each receive branch, the output signal of that receive branch is weighted with a branch weight associated with that receive branch. Furthermore, also in conformance with embodiments of the signal processing device 30 described above, the method comprises, for each receive branch, determining a branch signal error associated with that receive branch based on the joint received symbol and an input signal of that receive branch.

In conformance with embodiments of the signal processing device 30 described above, the method may comprise selecting the branch weights associated with the plurality of receive branches based on the branch signal errors associated with the plurality of receive branches. For example, similarly to what is described above in the context of the signal processing device 30, the method may comprise, for each receive branch, determining a mean square signal error (i.e. the different $MSE_i$ mentioned above) associated with that receive branch based on a plurality of samples of the branch signal error of that receive branch. Furthermore, also similarly to what is described above in the context of the signal processing device 30, selecting the branch weights associated with the plurality of receive branches based on the branch signal errors associated with the plurality of receive branches may comprise selecting said branch weights associated with the plurality of receive branches based on the determined mean square signal errors associated with the plurality of receive branches, e.g. in accordance with Eq. 2 above.

Similarly to what is described above in the context of the signal processing device 30, at least one of the receive branches may, in some embodiments, have an invertible transfer function. In conformance with the description of embodiments of the signal processing device 30 above, the method may then comprise, for each of said at least one receive branch, processing the joint received symbol with the inverse of said transfer function of that receive branch to determine a nominal input signal to that receive branch, and determining the branch signal error of that receive branch based on the nominal input signal of that receive branch and the actual input signal of that receive branch, for instance as illustrated in FIG. 4.

For each receive branch, processing the input signal of that receive branch may comprise filtering the input signal with an adaptive filter, such as the filter 70-i. In conformance with the description of embodiments of the signal processing device 30 above, the method may in that case comprise, for each receive branch, updating coefficients of the adaptive filter of that receive branch based on the branch signal error of that receive branch. Furthermore, also in conformance with the description of embodiments of the signal processing device 30 above, the method may comprise determining a joint signal error of the combined signal. In that case, and similarly to what is described above in the context of embodiments of the signal processing device 30, the method may then comprise, for each receive branch, updating coefficients of the adaptive filter of that receive branch based on a weighted signal error combination of the branch signal error of that receive branch and the joint signal error.

In conformance with the description of embodiments of the signal processing device 30 above, the method may in some embodiments comprise, for each receive branch, determining the weights of the branch signal error of that receive branch and the joint signal error in said weighted signal error combination based on current channel conditions of the radio reception paths. Also in conformance with the description of embodiments of the signal processing device 30 above, the method may in some embodiments comprise, for each receive branch, determining the weights of the branch signal error of that receive branch and the joint signal error in said weighted signal error combination based on current received signal power over said radio reception paths in a plurality of frequency sub bands, e.g. using Eq. 5 or the above mentioned look-up based approach.

Figure 10:
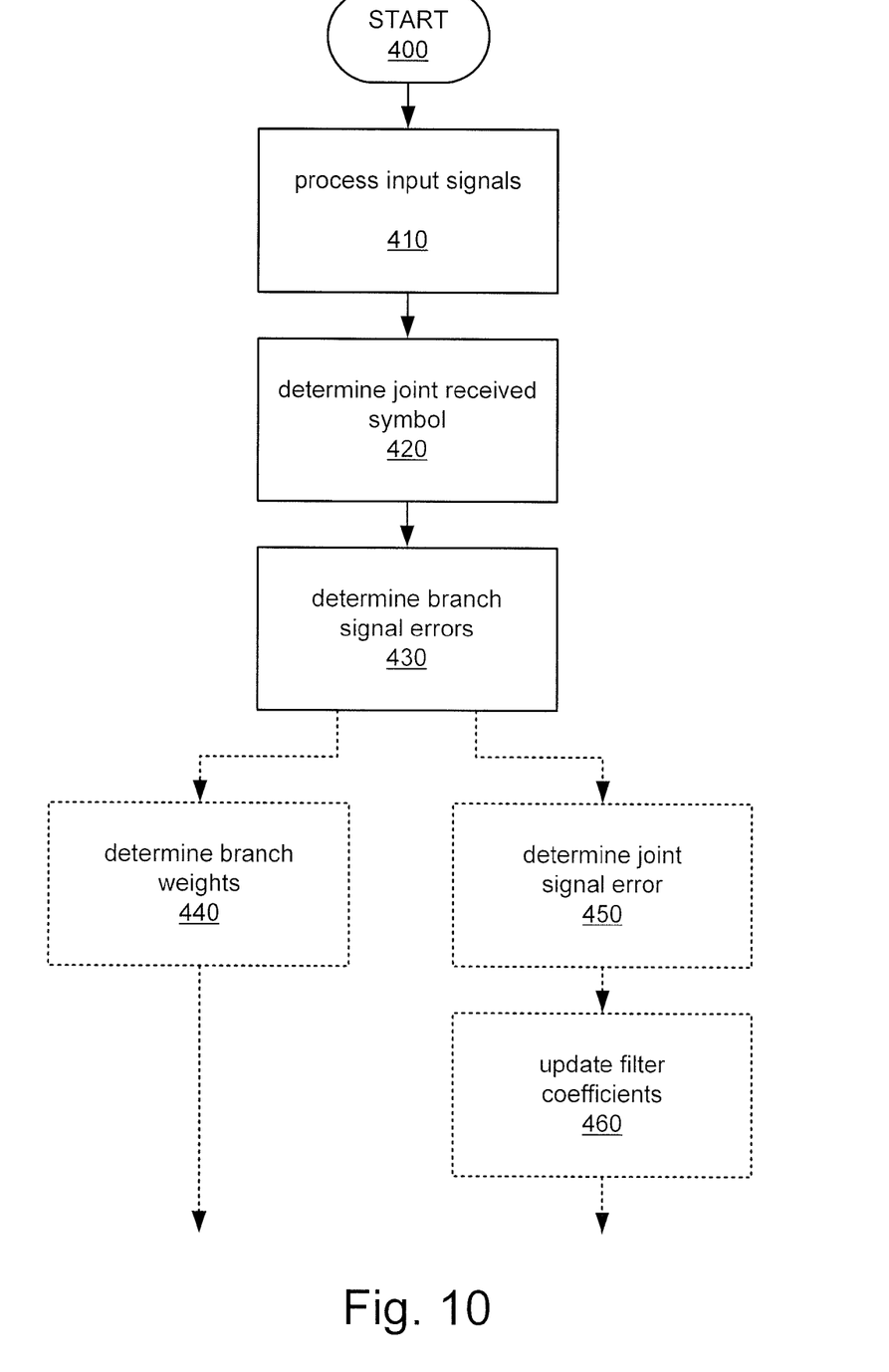
FIG. 10 is a flow chart of a method according to an embodiment of the present invention.

FIG. 10 is a flow chart of said method of signal processing for a diversity combining radio receiver according to an embodiment of the present invention. The operation is started in step 400. In step 410, the input signals to the receive branches are processed in the receive branches. In step 420, the joint received symbol is determined based on the combined signal. In step 430, the branch signal errors of the different receive branches are determined based on the joint received symbol and the input signals to the different branches. Possible uses of the branch signal errors are indicated with optional steps 440, 450 and 460 in FIG. 10. In step 440, the branch weights ($\alpha_i$) are determined based on the branch signal errors (e.g. using Eq. 2). In step 450, the joint signal error is determined, and in step 460, filter coefficients of adaptive filters of the different receive branches are updated based on combinations of the branch signal errors and the joint signal error, as is described above in the context of various embodiments.

Figure 11:
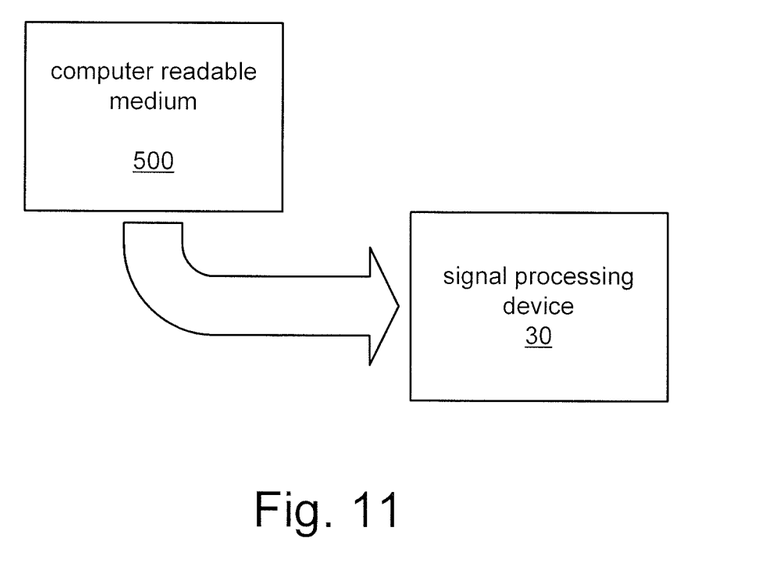
FIG. 11 schematically illustrates a computer readable medium and a programmable signal processing device according to an embodiment of the present invention.

The signal processing device 30 (FIG. 2) may be implemented as an application-specific hardware unit. Alternatively, the signal processing device 30 or parts thereof may be implemented using one or more configurable or programmable hardware units, such as but not limited to one or more field-programmable gate arrays (FPGAs), processors, or microcontrollers. Thus, the signal processing device 30 may be a programmable signal processing device. Hence, embodiments of the present invention may be embedded in a computer program product, which enables implementation of the method and functions described herein. Therefore, according to embodiments of the present invention, there is provided a computer program product, comprising instructions arranged to cause said programmable signal processing device 30 to perform the steps of any of the embodiments of the method described above. The computer program product may comprise program code which is stored on a computer readable medium 500, as illustrated in FIG. 11, which can be loaded and executed by said programmable signal processing device 30, to cause it to perform the steps of any of the embodiments of the method described above.

The present invention has been described above with reference to specific embodiments. However, other embodiments than the above described are possible within the scope of the invention. Different method steps than those described above, performing the method by hardware or software, may be provided within the scope of the invention. The different features and steps of the embodiments may be combined in other combinations than those described. The scope of the invention is only limited by the appended patent claims.

The invention claimed is:

1. A signal processing device for a diversity combining radio receiver, wherein the signal processing device comprises:
   a plurality of receive branches, wherein each receive branch is adapted to process an input signal originating from a corresponding radio reception path;
   a joint detector adapted to determine a joint received symbol based on a combined signal, which is a combination of weighted output signals from the plurality of receive branches, wherein, for each receive branch, the output signal of that receive branch is weighted with a branch weight associated with that receive branch; and
   a control unit adapted to, for each receive branch, determine a branch signal error associated with that receive branch based on the joint received symbol and the input signal of that receive branch, wherein
   each receive branch comprises an adaptive filter;
   the control unit is adapted to, for each receive branch, update coefficients of the adaptive filter of that receive branch based on the branch signal error of that receive branch; and
   the control unit is adapted to determine a joint signal error of the combined signal and, for each receive branch, update coefficients of the adaptive filter of that receive branch based on a weighted signal error combination of the branch signal error of that receive branch and the joint signal error, wherein a weight of the weighted signal error combination is selected based on channel conditions.

2. The signal processing device according to claim 1, wherein the control unit is further adapted to select the branch weights associated with the plurality of receive branches based on the branch signal errors associated with the plurality of receive branches.

3. The signal processing device according to claim 2, wherein the control unit is adapted to:
   for each receive branch, determine a mean square signal error associated with that receive branch based on a plurality of samples of the branch signal error of that receive branch; and
   select the branch weights associated with the plurality of receive branches based on the determined mean square signal errors associated with the plurality of receive branches.

4. The signal processing device according to claim 1, wherein:
   at least one of the receive branches has an invertible transfer function; and
   the control unit is adapted to, for each of the at least one receive branch, process the joint received symbol with the inverse of said invertible transfer function of that receive branch to determine a nominal input signal of that receive branch and determine the branch signal error of that receive branch based on the nominal input signal of that receive branch and the actual input signal of that receive branch.

5. The signal processing device according to claim 1, wherein the control unit is adapted to, for each receive branch, determine the weights of the branch signal error of that receive branch and the joint signal error in said weighted signal error combination based on current channel conditions of the radio reception paths associated with the receive branches.

6. The signal processing device according to claim 1, wherein the control unit is adapted to, for each receive branch, determine the weights of the branch signal error of that receive branch and the joint signal error in said weighted signal error combination based on current received signal power over said radio reception paths associated with the receive branches in a plurality of frequency sub bands.

7. A diversity combining radio receiver comprising:
   a signal processing device according to claim 1.

8. An electronic apparatus comprising the diversity combining radio receiver according to claim 7.

9. The electronic apparatus according to claim 8, wherein the electronic apparatus is a radio base station.

10. The electronic apparatus according to claim 8, wherein the electronic apparatus is a mobile terminal.

11. The electronic apparatus according to claim 8, wherein the electronic apparatus is a transceiver device for a fixed point-to-point radio link.

12. A method of signal processing for a diversity combining radio receiver, comprising:

for each of a plurality of radio reception path, processing an input signal originating from that radio reception paths in a corresponding receive branch of a plurality of receive branches;

determining a joint received symbol based on a combined signal, which is a combination of weighted output signals from the plurality of receive branches, wherein, for each receive branch, the output signal of that receive branch is weighted with a branch weight associated with that receive branch;

for each receive branch, determining a branch signal error associated with that receive branch based on the joint received symbol and an input signal of that receive branch;

for each receive branch, processing the input signal comprises filtering the input signal with an adaptive filter;

for each receive branch, updating coefficients of the adaptive filter of that receive branch based on the branch signal error of that receive branch;

determining a joint signal error of the combined signal; and for each receive branch, updating coefficients of the adaptive filter of that receive branch based on a weighted signal error combination of the branch signal error of that receive branch and the joint signal error, wherein a weight of the weighted signal error combination is selected based on channel conditions.

13. The method according to claim 12, further comprising:
selecting the branch weights associated with the plurality of receive branches based on the branch signal errors associated with the plurality of receive branches.

14. The method according to claim 13, comprising:
for each receive branch, determining a mean square signal error associated with that receive branch based on a plurality of samples of the branch signal error of that receive branch;

and wherein selecting the branch weights associated with the plurality of receive branches based on the branch signal errors associated with the plurality of receive branches comprises selecting said branch weights associated with the plurality of receive branches based on the determined mean square signal errors associated with the plurality of receive branches.

15. The method according to claim 12, wherein:
at least one of the receive branches has an invertible transfer function; and the method comprises;
for each of the at least one receive branch
processing the joint received symbol with the inverse of said transfer function of that receive branch to determine a nominal input signal to that receive branch; and determining the branch signal error of that receive branch based on the nominal input signal of that receive branch and the actual input signal of that receive branch.

16. The method according to claim 12, comprising:
for each receive branch, determining the weights of the branch signal error of that receive branch and the joint signal error in said weighted signal error combination based on current channel conditions of the radio reception paths associated with the receive branches.

17. The method according to claim 12, comprising:
for each receive branch, determining the weights of the branch signal error of that receive branch and the joint signal error in said weighted signal error combination based on current received signal power over said radio reception paths associated with the receive branches in a plurality of frequency sub bands.

18. A computer program product embodied in a non-transitory computer-readable medium comprising non-transitory computer program code for executing the method according to claim 12, when said computer program code is run by a programmable signal processing device of the diversity combining radio receiver.

19. A non-transitory computer readable medium having stored thereon a computer program product comprising non-transitory computer program code for executing the method according to claim 12, when said computer program code is run by a programmable signal processing device of the diversity combining radio receiver.

* * * * *